(No Model.)  J. H. SPARROW, dec'd,  3 Sheets—Sheet 1.
J. A. B. SPARROW, Adm'x.
WEIGHING SCALE FOR HIDES AND TALLOW.
No. 243,811.  Patented July 5, 1881.

Witnesses:
Administratrix:
Julia A. B. Sparrow
by N. C. Lombard
Attorney.

(No Model.) 3 Sheets—Sheet 2.
J. H. SPARROW, dec'd,
J. A. B. SPARROW, Adm'x.
WEIGHING SCALE FOR HIDES AND TALLOW.

No. 243,811. Patented July 5, 1881.

(No Model.) 3 Sheets—Sheet 3.

J. H. SPARROW, dec'd,
J. A. B. SPARROW, Adm'x.
WEIGHING SCALE FOR HIDES AND TALLOW.

No. 243,811. Patented July 5, 1881.

Witnesses:
Alpheus R. Hale
Walter E. Lombard

Administratrix:
Julia A. B. Sparrow
by N. C. Lombard
Attorney.

UNITED STATES PATENT OFFICE.

JULIA A. B. SPARROW, OF CAMBRIDGEPORT, MASSACHUSETTS, ADMINISTRATRIX OF JAMES H. SPARROW, DECEASED.

WEIGHING-SCALE FOR HIDES AND TALLOW.

SPECIFICATION forming part of Letters Patent No. 243,811, dated July 5, 1881.

Application filed April 16, 1881. (No model.)

*To all whom it may concern:*

Be it known that JAMES H. SPARROW, late of Cambridgeport, in the county of Middlesex and State of Massachusetts, deceased, did during his life-time invent certain new and useful Improvements in Weighing-Scales, of which the following, taken in connection with the accompanying drawings, is a specification.

This invention relates to a weighing apparatus designed more especially for use in slaughter-houses for weighing the hides and tallow, and has for its object a reduction in the labor of weighing such articles; and it consists in the combination, with a weighing mechanism, of a pivoted scale pan or hopper arranged to be locked in a horizontal position, and adapted by tripping said locking device to be tilted about its pivotal axis in either of two opposite directions, for the purpose of discharging its contents into receptacles placed beneath said pan for the purpose.

It further consists in a novel method of hanging said scale-pan and connecting it with the scale-beam, which will be readily understood by reference to the description of the drawings and the claims to be hereinafter given.

Figures 1, 4:
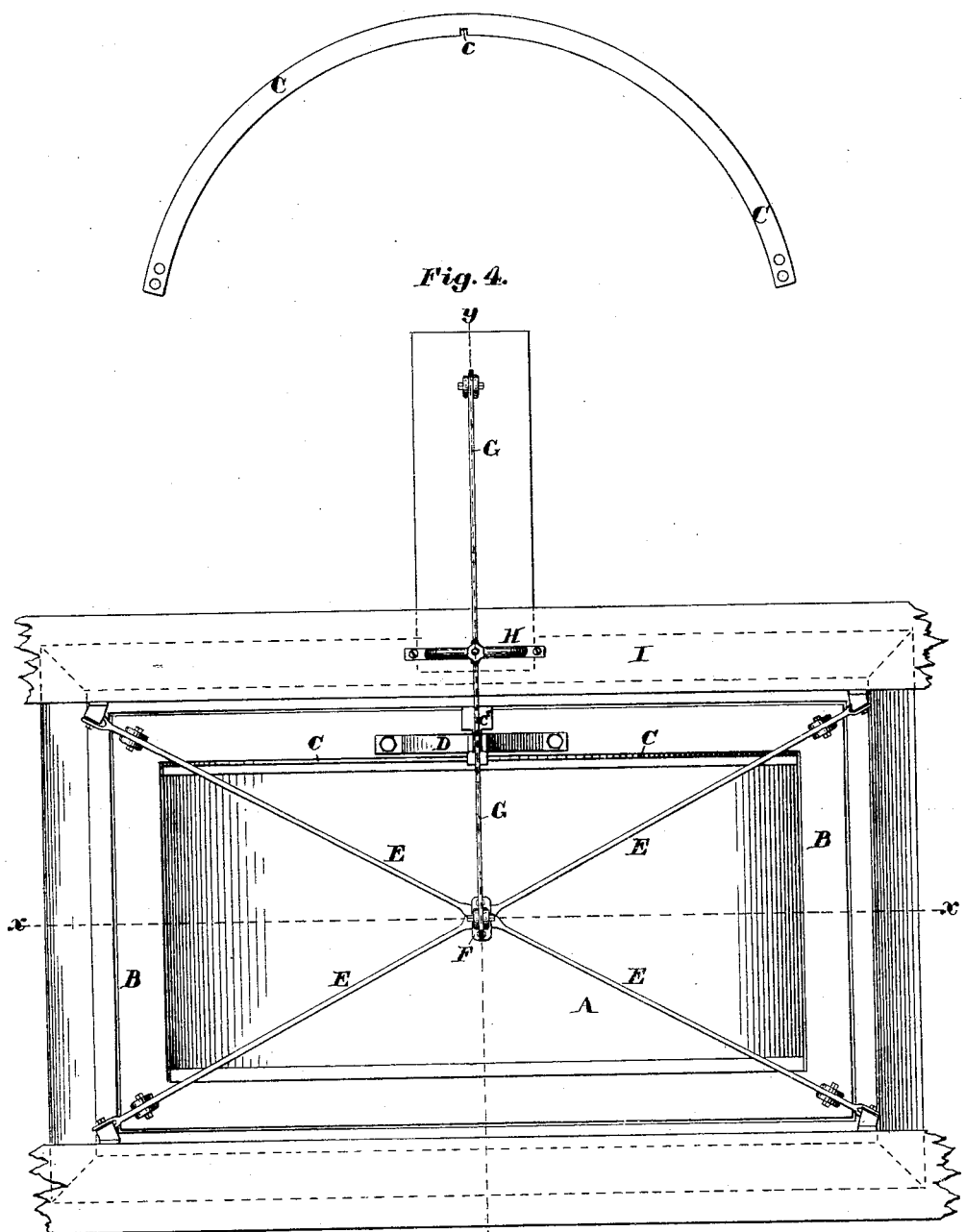
Figure 2:
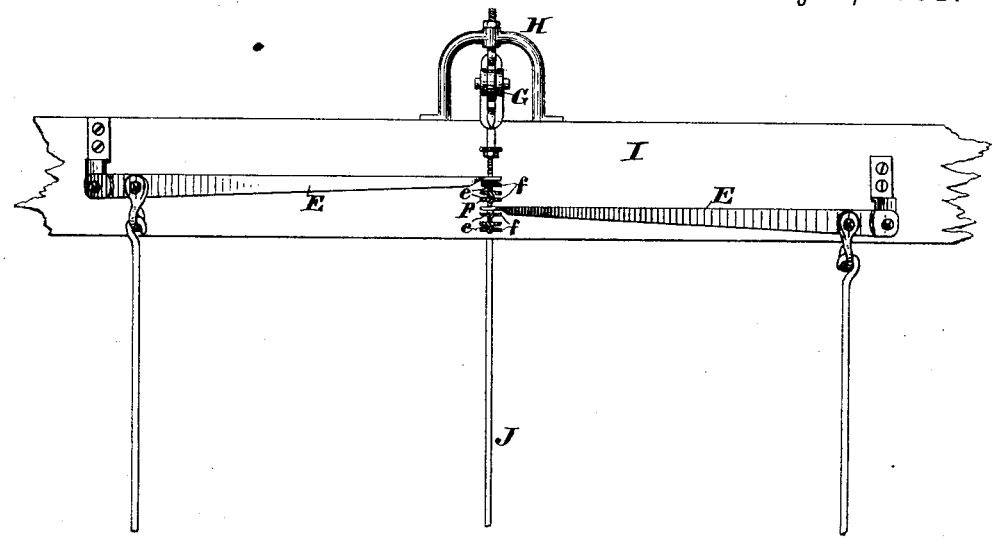
Figure 2:
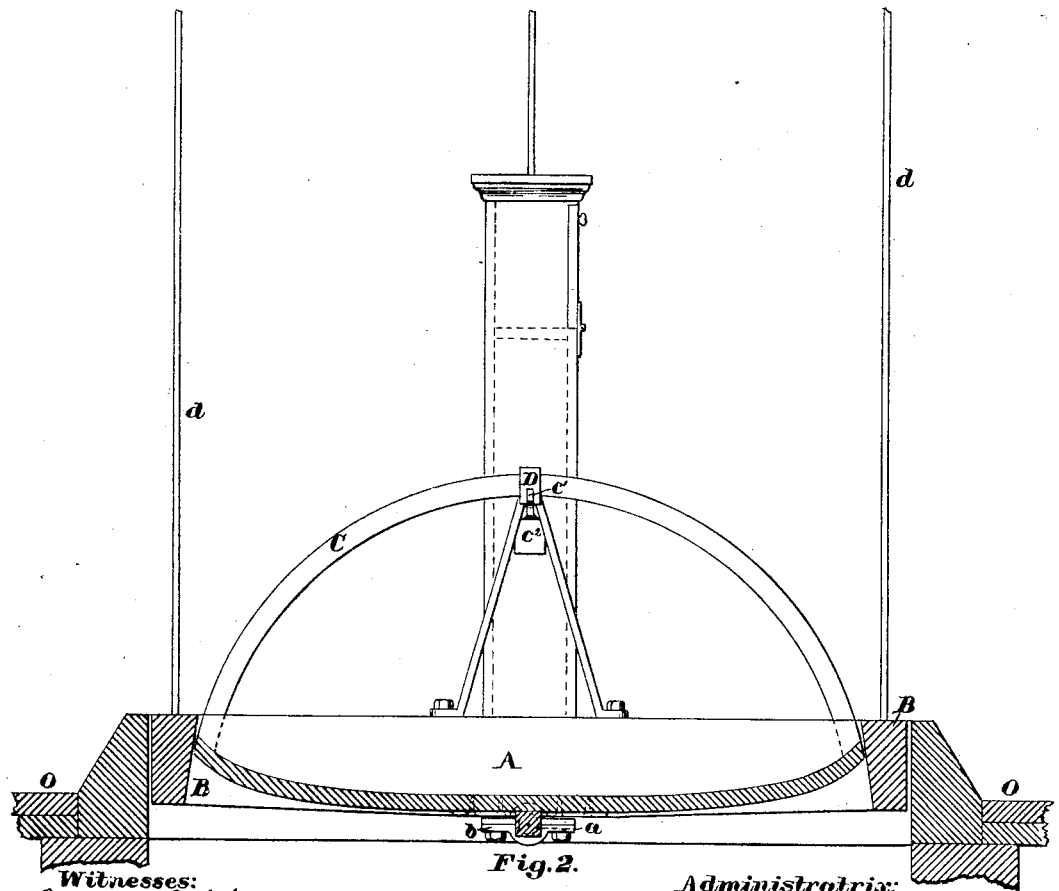
Figure 3:
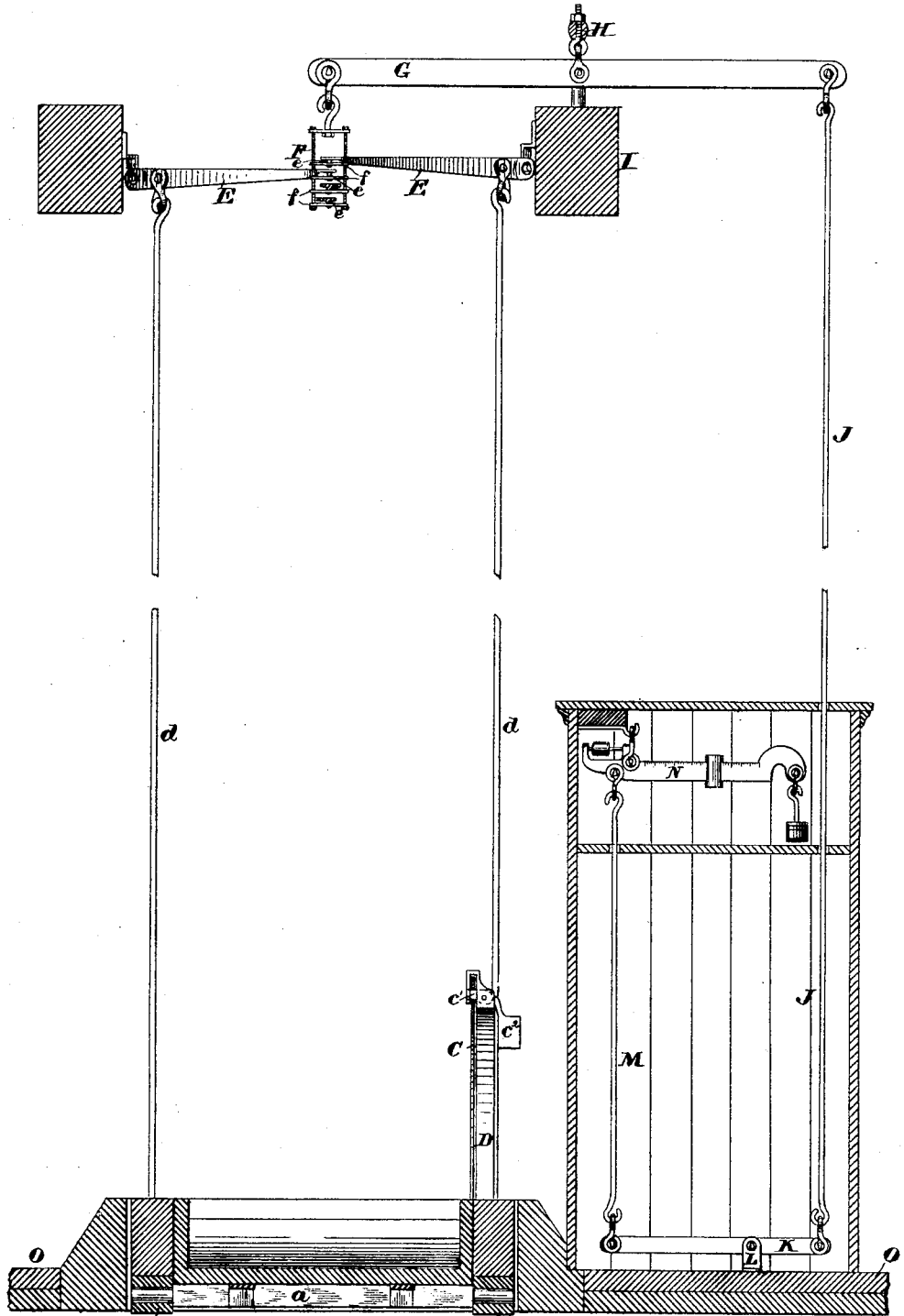

Figure 1 of the drawings is a plan of a weighing apparatus embodying this invention. Fig. 2 is a vertical section of the same on line $x\ x$ on Fig. 1. Fig. 3 is a vertical section on line $y\ y$ on Fig. 1, and Fig. 4 is a detail.

A is the scale pan or hopper mounted upon the shaft $a$, which has its bearings in the boxes $b\ b$, bolted to the under side of the rectangular frame B, which surrounds the pan A, and within which said pan may be tilted in either direction about the axis of the shaft $a$.

To one side of the pan A are firmly secured both ends of the sector C, which projects upward therefrom, and is embraced by the stand D, the base of which is bolted to the frame B, as shown.

In the center of the arc of the sector C, and in its under edge, is formed a detent-notch, $c$, (shown in Fig. 4,) with which the latch $c'$ engages when the pan is in a horizontal position, to lock and hold it in such position, said latch $c'$ being impelled to engage with said notch $c$ by the force of gravity acting upon the weight $c^2$, connected to or forming a part of said latch.

The frame B, supporting the pan A, is suspended by four rods, $d\ d$, from the four levers E E, the outer ends of which are fulcrumed upon suitable knife-edged bearings secured to the timbers of the floor of the building above the pan A, as shown, while their inner ends are all connected to the compound stirrup F, each lever being provided with a rounded teat or projection, $e$, which fits into and has its bearing in a corresponding-shaped recess formed in one of the cross-bars, $f$, of the stirrup F, as shown in Figs. 2 and 3. The stirrup F is suspended by suitable knife-edge bearings from one end of the lever G, which has its fulcrum upon knife-edge bearings depending from the stand H, secured to the upper side of the beam I, and from knife-edge bearings set in the other end of said lever G depends the rod J, the lower end of which is in like manner connected to one end of the lever K, which has its fulcrum on knife-edge bearings in the stand L, as shown in Fig. 3. The opposite end of the lever K is connected by the rod M to the short arm of the scale-beam N, said rod having its bearing at each end upon suitable knife-edges, as shown in Fig. 3.

The frame B hangs within a rectangular opening in the floor O of the slaughter-house, within which it is free to be moved up and down slightly, according as a greater or less weight is placed in the pan A.

This apparatus is used for weighing the hides and tallow taken from beef-cattle in the slaughter-house, and when the hides have been weighed the latch $c'$ is disengaged from the notch $c$, and the pan A is tilted about its pivotal axis to dump the hides into a receptacle (not shown) located beneath one side of the pan A. If tallow is weighed, the pan A is tilted in the opposite direction, and the tallow is discharged into its appropriate receptacle located beneath the other half of said pan, thus materially lessening the labor of taking care of the hides and tallow after they are weighed.

What is claimed is—

1. In combination with a weighing mechanism, the frame B, suspended within an opening in the floor O, the pan A, pivoted by its middle to said frame, and mechanism for locking said pan in a horizontal position, substantially as described.

2. In combination with a weighing mechanism, the frame B, rods $d\ d$, levers E E, stirrup F, levers G and K, rods J and M, the pivoted pan A, and mechanism for locking said pan in a horizontal position, all arranged and adapted to operate substantially as and for the purposes described.

Executed at Boston, Massachusetts, this 9th day of April, 1881.

JULIA A. B. SPARROW,
*Administratrix of the estate of James H. Sparrow.*

Witnesses:
 N. C. LOMBARD,
 W. E. LOMBARD.